United States Patent [19]

Eiselbrecher et al.

[11] 4,228,976

[45] Oct. 21, 1980

[54] MAIN CONNECTOR FOR AN AIRFOIL OR WING

[75] Inventors: Max Eiselbrecher, Unterpfaffenhofen; Rolf Guenther, Munich; Helmut Jakob, Zorneding, all of Fed. Rep. of Germany

[73] Assignee: Messerschmitt-Boelkow-Blohm GmbH, Munich, Fed. Rep. of Germany

[21] Appl. No.: 907,405

[22] Filed: May 18, 1978

[30] Foreign Application Priority Data

May 13, 1977 [DE] Fed. Rep. of Germany ....... 2721651

[51] Int. Cl.² ............................ B64C 3/20; B64C 3/24
[52] U.S. Cl. ................................... 244/123; 244/131; 244/133; 416/230
[58] Field of Search ............... 244/131, 123, 124, 133; 416/226, 230, 230 A, 239, 248

[56] References Cited

U.S. PATENT DOCUMENTS

| 3,645,829 | 2/1972 | Palfreyman et al. ............ 244/123 X |
| 3,782,856 | 1/1974 | Salkind et al. .............. 416/230 A X |
| 3,950,115 | 4/1976 | Euler .............................. 244/123 X |

FOREIGN PATENT DOCUMENTS 1781322  1/1971  Fed. Rep. of Germany .

*Primary Examiner*—Barry L. Kelmachter
*Attorney, Agent, or Firm*—W. G. Fasse; D. F. Gould

[57] ABSTRACT

An airfoil or wing is connected to the body of an aircraft or spacecraft through a main connector comprising metal and nonmetal components. Tension load take-up loops and a pressure load take-up core are arranged or held in a metal grommet which in turn is centered relative to and integrated with a main connector bushing. Thus, the tension loads are solely introduced into the wing structure through the tension loops and pressure loads are taken up solely by the pressure core, whereby the advantages of fiber compound materials are optimally utilized.

8 Claims, 5 Drawing Figures

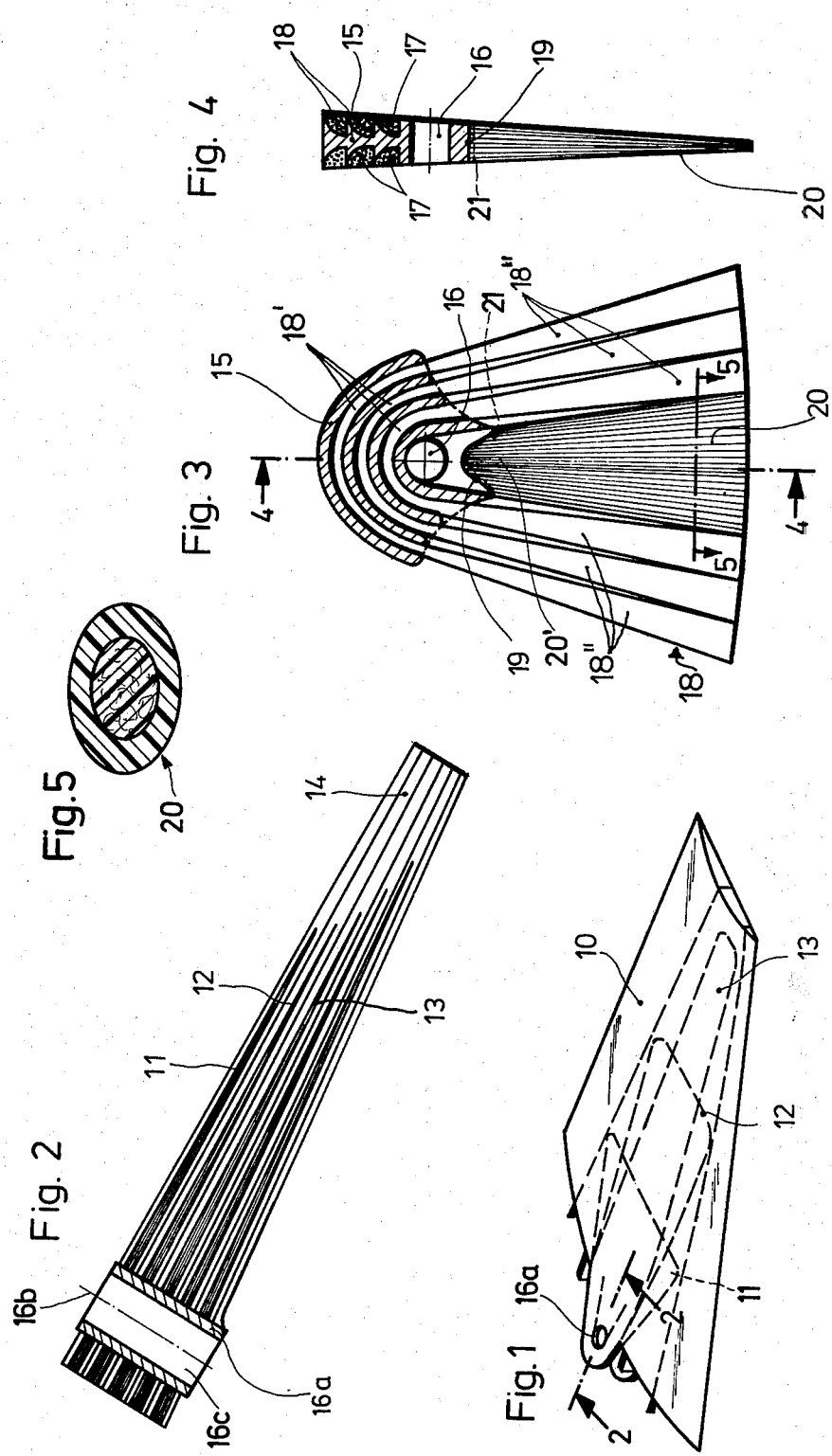

MAIN CONNECTOR FOR AN AIRFOIL OR WING

BACKGROUND OF THE INVENTION

The present invention relates to a main connector for an airfoil or wing of an aircraft or of a spacecraft. The connector and the wing are constructed of interconnected metallic and nonmetallic materials.

Wings of fiber reinforced synthetic material and of compound construction are known in the art from German Patent Publications 2,032,283 and 2,109,692. German Patent Publication 2,032,283 discloses a wing structure of tubular individual elements which are manufactured of fiber reinforced synthetic material. The fiber material is made of carbon fibers. The tubular elements are interconnected by means of synthetic material strips which also reinforce the tubular elements.

German Patent Publication 2,109,692 discloses a wind box made by the compound construction manner. The box comprises a shell of fiber reinforced matrix material. The shell is glued together by means of divided metal sectional moldings. The shell made of BFK-material (Boron fibre reinforced composite), the titanium-quartz-sections and the aluminum sectional ribs exhibit a certain layer number ratio to the fiber reinforced matrix material. The just mentioned constructions are intended to make possible the manufacture of aircraft wings of synthetic materials. However, the structural components for connecting the wing to the aircraft body are still much too expensive in the prior art structures and also too heavy in order to have a structure capable of taking up the forces to be transmitted. German Patent Publication 1,781,322 (DAS) discloses a wing structure in which each spar or girder is made of high strength metallic and nonmetallic material layers bonded to each other by adhesives. The spars or girders extend in vertical planes and are shorter and shorter as viewed from the spar or girder foot and in the outward direction so that the result is a beam which has a width diminishing in steps. In this type of prior art structure the nonmetallic material layers are made of fiber mats or webbings impregnated with resin. Each of the individual structural elements is, however, subject to the pressure loads as well as to the tensile loads and also to sheering forces and torsional loads. Thus, this type of conception requires a substantially reinforced structure, whereby the advantages available from fiber compound materials are not utilized in an optimal manner.

OBJECTS OF THE INVENTION

In view of the above it is the aim of the invention to achieve the following objects singly or in combination:

to construct a wing or airfoil main connector for aircraft and/or spacecraft in which each of the elements used are exposed either to tension loads only or to pressure loads only in accordance with the fiber compound material used;

to construct a connector for a wing or airfoil which utilizes the advantages of fiber compound materials in an optimal manner;

to construct a connector in such a manner that the forces are introduced into the wing in a surface distribution manner, whereas the bolt connecton to the body of the craft is retained;

to avoid loading each individual structural element with mixed loads; and to substantially lengthen the useful life of such a connector and to increase the safety as well as the wear and tear resistance substantially while simultaneously keeping the weight of the structure as low as possible.

SUMMARY OF THE INVENTION

According to the invention there is provided a main connector for securing an airfoil or wing to the body of an aircraft or spacecraft. For this purpose the invention provides pressure bodies and tension loops arranged in a metal grommet for introducing the pressure forces and tension forces into the outer skin of the wing as well as into the internal structure of the wing box. The metal grommet in turn is centered to and integrated with a main connector bearing bushing. The combination of these features now makes it possible to optimally utilize fiber materials in so-called compound construction for producing high strength airfoils or wings. In addition it is possible now to construct these wings more advantageously with regard to their weight and with regard to their manufacturing costs both of which have been lowered according to the invention. Another advantage of the invention is seen in that the force introduction into the wing is now possible in a surface area manner whereas the wing may still be secured to the body of the craft by means of a bolt connection.

BRIEF FIGURE DESCRIPTION

In order that the invention may be clearly understood, it will now be described, by way of example, with reference to the accompanying drawings, wherein:

FIG. 1 is a perspective view onto a wing constructed according to the invention, whereby the illustration is somewhat simplified in a schematic manner;

FIG. 2 is a sectional view along section line 2—2 in FIG. 1;

FIG. 3 is a plan view partially in section whereby the section plane extends through the horizontal plane of one of the layers of the main wing connector;

FIG. 4 is a sectional view along the section line 4—4 in the illustration of FIG. 3; and FIG. 5 is a sectional view along section line 5—5 in FIG. 3.

DETAILED DESCRIPTION OF PREFERRED EXAMPLE EMBODIMENTS

FIG. 1 shows in a schematic illustration a somewhat perspective top plan view of an airfoil or wing 10 of an aircraft. The wing structure comprises a plurality of hybrid loop blades 11, 12, 13 and so on, which have different shapes, different surface areas, and different lengths as seen in FIGS. 1 and 2. The hybrid blades are inserted or embedded into the laminae forming the outer skin of the wing as well as into the laminated layers 14 forming the wing box. These hybrid loop blades 11, 12, 13 are made of fiber compound materials which have been cured. FIG. 2 shows a somewhat enlarged portion of the wing of FIG. 1 along the section line 2—2 shown in FIG. 1. A main connector bearing bushing 16a provides with its central axis 16B a centering for the metal grommet 15 shown in more detail in FIG. 3. The bearing bushing 16a has a bore 16c with said longitudinal central axis 16b. The main connector bolt extends through the bore 16 of the grommet 15 and through the bore 16c of the bearing bushing 16a. The bolt is not shown since it is not part of the invention.

FIGS. 3 and 4 show the horizontal and vertical section respectively through a wing connector grommet 15 according to the invention. The metal grommet 15 has a special shape as illustrated, whereby the bore 16 of the grommet 15 receives the bearing bushing 16a. The grommet 15 and the bearing bushing 16a form a centered structure as shown in FIG. 2. Further, the grommet 15 has bearing recesses 17 wherein the bights 18' of the tension loops 18 are supported. Each tension loop 18 has two legs 18'' which fan out from the grommet 15 as shown in FIG. 3. The tension loops 18 are made of a fiber compound material such as KFK-material also known as carbon fibre reinforced composite. The grommet 15 is also coated with synthetic material and the recesses 17 have a particular shape which permits the tension loops to assume the cross sectional configuration best suited for transmitting tension loads. These recesses are arranged in succession on both sides of the grommet and a conically shaped pressure body 20 is inserted between the outwardly flaring legs of the tension loads transmitting loops. The legs 18'' of the tension loops 18 in each layer form the hybrid loop blade 11, 12, or 13 whereby forces are distributed into the wing in a surface area manner as mentioned above in the Summary. The tension load transmitting loops 18 are arranged with their legs to fan or flare outwardly as shown in FIG. 3 to form a conical configuration which corresponds to the tension cone when loads are introduced into the wing. Due to the just described features, the invention achieves a continuous transition between the compound fibers to the laminae of the wing structure including the outer skin as well as the internal components of the wing. In addition, the invention achieves a continuous force distribution characteristic.

The pressure cone or body 20 has a foot 20' with a configuration corresponding to the radially outwardly facing projection surface 19 of the metal grommet 15. Thus, in the illustrated example the surface 19 forms a concave cavity and the foot 20' of the pressure cone or body 20 has a corresponding convex configuration fitting into the concave cavity of the surface 19. This feature of the invention has the advantage that when pressure loads are applied, the formation of the respective pressure cone is facilitated and the pressure cone or pressure force distribution is confined to the pressure cone or body 20. The pressure cone 20 is made preferably of BFK-material also known as Boron fibre reinforced composite. Further, in order to improve the force distribution at the interface between the convex foot 20' of the pressure core 20 and the concave surface 19 of the metal grommet 15 a filler material 21 may be inserted between the surface 19 and the foot 20'. Such filler material may be a curable compound such as Epoxy-resin with glas-powder.

FIG. 5 illustrates a sectional view through the pressure core 20 to show that further weight may be saved by making the pressure core or fiber compound material hollow on the inside and by filling the hollow space with a foam material as indicated. The foam material could, for example, be epoxy resin.

As mentioned, the tension transmitting loops 18 and the pressure body 20 are preferably made of compound fiber material such as KFK (carbon fibre reinforced composite, BFK (Boron fibre reinforced composite), GFK (Glas fibre reinforced composite), or kevlar compound material.

The legs 18'' of the loops 18 which form the hybrid loop blades 11, 12, 13, fan out from the grommet 15 as shown in FIG. 3. Additionally, these blades 11, 12, 13, have different lengths, which decrease from the bottom of the wing to the top of the wing as shown in FIGS. 1 and 2. The blades 11, 12, 13 also have different shapes as shown in FIG. 1. Thus, the wing tapers towards its tip as shown in FIGS. 1 and 2. The legs 18'' of the tension loops 18 comprise a plurality of windings of yarn threads which are held in the above mentioned recesses 17 of the metal grommet 15 to transmit tension forces only. Since the legs 18'' of the loop blades 11, 12, 13, and so forth are embedded in their fanned out condition into the laminae structure 14 of the wing, an area type of force introduction and distribution is accomplished. Due to the fact that for each type of force or load that must be taken up, the so-called hybrid loop blades comprise a fiber winding extending in the respective direction, each individual structural component is subject only to the type of force to which it is exposed and it is relieved from any other additional forces. This feature of the invention has the advantage that the loop blades may be dimensioned or constructed in their shape, dimension and size with due regard to the respective force to be taken up by the particular structural component. Due to this fact, namely, that for each of the forces to be taken up a respective structural element is provided which is shaped in accordance with the force that it is supposed to take up, the invention greatly increases the operational life of the present wings and the wing connectors and thus also the safety and the wear and tear resistance.

Crosswise effective forces may be taken up in a wing connector structure according to the invention by the spars or girders of the wing box. On the other hand, torsion forces may be taken up by providing separate connecting points. The invention is not concerned with these torsional and cross forces.

Although the invention has been described with reference to specific example embodiments, it will be appreciated, that it is intended to cover all modifications and equivalents within the scope of the appended claims.

What is claimed is:

1. A wing structure having a free end forming a wing tip and a connector end adapted to be connected to a craft, said wing structure further including a leading edge and a trailing edge, comprising a plurality of laminated layers (14) and connector means (16) secured to said connector end of said wing structure, said connector means comprising a connector bore (16c) with a central axis (16b) and metal grommet means (15) centered relative to said central axis (16b), said metal grommet means (15) comprising a plurality of bearing recesses (17) arranged in radial succession at radii which increase from said central axis (16b) away from said wing tip, said wing structure further comprising tension loop means (18) each having two loop legs (18'') and a bight (18') connecting the respective two loop legs, each loop bight being held in one of said bearing recesses (17) of the metal grommet means (15), said loop legs (18'') being spread out substantially between said leading edge and said trailing edge of said wing structure, said spread out loop legs being embedded in said laminated layers (14) whereby said loop legs (18'') are operatively connected to said wing structure for introducing substantially tension loads only into said wing structure, said metal grommet means further comprising a concavity (19) opening toward said wing tip, and pressure body means (20) operatively held at one end (20') thereof in said concavity (19) of said metal grommet means (15) and operatively connected to said wing structure between said loop legs (18) for introducing substantially pressure loads only into said wing structure.

2. The wing structure of claim 1, wherein said pressure body means (20) comprise a pressure core made of BFK material, said pressure body means extending substantially perpendicularly relative to said central axis (16b) of said connector bore (16c), said tension loop means being arranged about said pressure core.

3. The wing structure of claim 1, wherein said tension loop means (18) are made of threads of BFK material, said bearing recesses (17) of the metal grommet means (15) having a predetermined shape whereby the loop bights of the tension loop means are shaped to conform to the predetermined shape of said bearing recesses.

4. The wing structure of claim 1, wherein said one end (20') of said pressure body means (20) forms a foot of convex configuration fitting into said concavity (19) of said metal grommet means (15).

5. The wing structure of claim 4, further comprising force distributing means (21) operatively interposed between the convex foot (20') of said pressure body means (20) and said concavity (19) of said metal grommet means (15).

6. The wing structure of claim 5, wherein said force distributing means (21) comprise a curable filler material.

7. The wing structure of claim 1, wherein said pressure body means (20) form a hollow core filled with a foam material.

8. The wing structure of claim 1, wherein said loop legs of the tension loop means (18) have differing lengths, said tension loop means being arranged so that the longest tension loop means is located near the wing bottom surface while the shortest tension loop means is located close to the wing top surface whereby the wing structure tapers toward said tip.

* * * * *